United States Patent
Dickens et al.

(10) Patent No.: US 7,721,164 B2
(45) Date of Patent: May 18, 2010

(54) METHOD AND APPARATUS FOR IMPROVED STORAGE AREA NETWORK LINK INTEGRITY TESTING

(75) Inventors: Louie Arthur Dickens, Tucson, AZ (US); Olive Paige Faries, Tucson, AZ (US); Michael Starling, Tucson, AZ (US); David L. Binning, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/130,265

(22) Filed: May 30, 2008

(65) Prior Publication Data

US 2009/0296796 A1 Dec. 3, 2009

(51) Int. Cl.
*G11C 29/00* (2006.01)
*G01R 31/28* (2006.01)
*G01R 29/26* (2006.01)
*H04B 3/46* (2006.01)
*H04J 3/06* (2006.01)

(52) U.S. Cl. .............. 714/715; 714/712; 714/741; 702/69; 375/226; 375/371; 370/516

(58) Field of Classification Search .............. 714/712, 714/715, 741; 702/69; 375/226, 371; 370/516
See application file for complete search history.

(56) References Cited

U.S. PATENT DOCUMENTS

| | | | |
|---|---|---|---|
| 5,220,581 A | 6/1993 | Ferraiolo et al. | |
| 6,115,361 A * | 9/2000 | Fredericks et al. | 370/242 |
| 6,172,992 B1 | 1/2001 | Hoffmann et al. | |
| 6,658,540 B1 * | 12/2003 | Sicola et al. | 711/162 |
| 6,665,316 B1 | 12/2003 | Eidson | |
| 6,795,515 B1 | 9/2004 | Riedle et al. | |
| 7,308,620 B1 | 12/2007 | Talbot | |
| 2005/0086563 A1 | 4/2005 | Carballo | |
| 2006/0023778 A1 | 2/2006 | Bergmann et al. | |
| 2006/0200708 A1 | 9/2006 | Gentieu et al. | |
| 2006/0209769 A1 | 9/2006 | Akamatsu et al. | |
| 2006/0209943 A1 | 9/2006 | Whitby-Strevens | |
| 2007/0088998 A1 | 4/2007 | Bonneau et al. | |
| 2007/0089006 A1 | 4/2007 | Zimmerman | |
| 2008/0077828 A1 * | 3/2008 | Sasaki | 714/715 |

OTHER PUBLICATIONS

An article entitled "Intergrated Optical 2x2 Switch for Wavelength Multiplexed Interconnects" by Williams et al., Feb. 2005, Retrieved from the internet: http://www.intel-research.net/Publications/Cambridge/120920040708_297.pdf.

An article entitled "A 10.-Gb/s High-Isolation, 16 16 Crosspoint Switch Implemented with AIGaAs/GaAs HBT's" by Metzger et al., IEEE Journal of Solid-State Circuits, vol. 35, No. 4, Apr. 2000, Retrieved from the Internet: http://sigma.ucsd.edu/research/articles/2000/2000_9.pdf.

* cited by examiner

*Primary Examiner*—John J Tabone, Jr.
(74) *Attorney, Agent, or Firm*—Connolly Bove Lodge & Hutz LLP

(57) ABSTRACT

A method and apparatus that is configured to issue an echo extended link service with a payload of data patterns that are known in the art of fiber channel to produce jitter. The inventive apparatus is configured to use an echo extended link service to send data with a specified data pattern. Failing data patterns are compared against data patterns that are known in the art of fiber channel to create jitter and the results may be presented to the user.

19 Claims, 6 Drawing Sheets

METHOD AND APPARATUS FOR IMPROVED STORAGE AREA NETWORK LINK INTEGRITY TESTING

BACKGROUND OF THE INVENTION

1. Field of the Invention

The present invention is directed to a testing device used in fibre channel (Ficon), wherein the testing device uses various data patterns to ensure that link receivers and transmitters function according to specification across an entire storage area network (SAN).

2. Description of the Related Art

Today's higher data rates and embedded clocks may result in greater susceptibility to link problems which include jitter and degrading bit error rate (BER) performance. Jitter is an unwanted variation of one or more signal characteristics in electronics and telecommunications. Jitter may be seen in characteristics such as the interval between successive pulses, or the amplitude, frequency, or phase of successive cycles.

The process of determining if jitter, signal integrity, or degrading bit error rates exist is very complex and requires a great deal of expertise in the area of electronics and signal analysis. Currently there is no way for one skilled in the art without complex equipment to determine if they have these problems.

BRIEF SUMMARY OF THE INVENTION

The present invention is directed to a device including a Fibre Channel adapter card. The inventive device uses a device driver with a pass through mode and is configured to issue an echo extended link service with a payload of data patterns that are known in the art of fibre channel to produce jitter. The device may operate in several modes, including an automatic mode or a user select mode. In the automatic mode, the device is configured to send all possible random data patterns starting at 00 thru ff., using random frame sizes and random amounts of frames. In the user select mode, the user of the device may specify the data pattern or a range of data patterns to use, and how much data is to be sent in the echo extended link service. The device is configured to perform any setup required by the protocol in order to be able to send input and receive output. For example, the setup may include logins (fabric and port logins) and device discovery, as necessary.

The inventive device is configured to use the echo extended link service to send data with a specified data pattern. The data amount may be specified by a user or chosen randomly in the automatic mode. The data pattern may also be specified by the user or the data pattern may be sequential data patterns chosen by default in the automatic mode.

In an embodiment of the invention, failing data patterns are compared against data patterns that are known in the art of fibre channel to create jitter and the results may be presented to the user. In all modes, the end user may receive a report of success or failure and any other information that is applicable and available.

DETAILED DESCRIPTION OF EMBODIMENTS

Embodiments in which the present invention is applied to testing in fibre channel to ensure that link receivers and transmitters function across an entire storage area network (SAN) are described in detail below with reference to the accompanying drawings.

An embodiment of the invention emulates a switch port behavior (E port), Fabric port behavior (F port) and Node port behavior (Nx port), as known in the art of fibre channel. Through switch emulation, the invention is able to participate in the storage area network as a switch. In particular, switch emulation enables an apparatus implementing the present invention to discover all the switches (domains) and all the ports (Nx) in the entire storage area network.

A testing device implementing an embodiment of the invention logs in, as known in the art of Fibre channel, to all Nx ports within the storage area network and performs a test to determine if jitter exists. In an embodiment of the invention, the testing device issues a switch internal link service (sw_ils) called Switch Trace Route (SIR). The STR sw_ils returns a list of all the switches and all paths from the testing device to an end device to be tested. Since the entire path from the testing device to the end device is known, an embodiment of the invention may interrogate each link and port along the way to identify a failing link or port. Link interrogation may be performed through the use of various methods. For example, link interrogation may be performed through an external link service, for example as read link error status block (RLS) which may be issued to the end port. In another example, link interrogation may be performed through a fibre channel generic service, for example as get port statistics (GPS) which may be issued to each of the individual switch ports to obtain the port statistics for each port in the path. The RLS and GPS may be issued before and after transmitting data. This behavior allows the testing device to identify failing data patterns and the failing link(s) or port(s).

Figure 1:
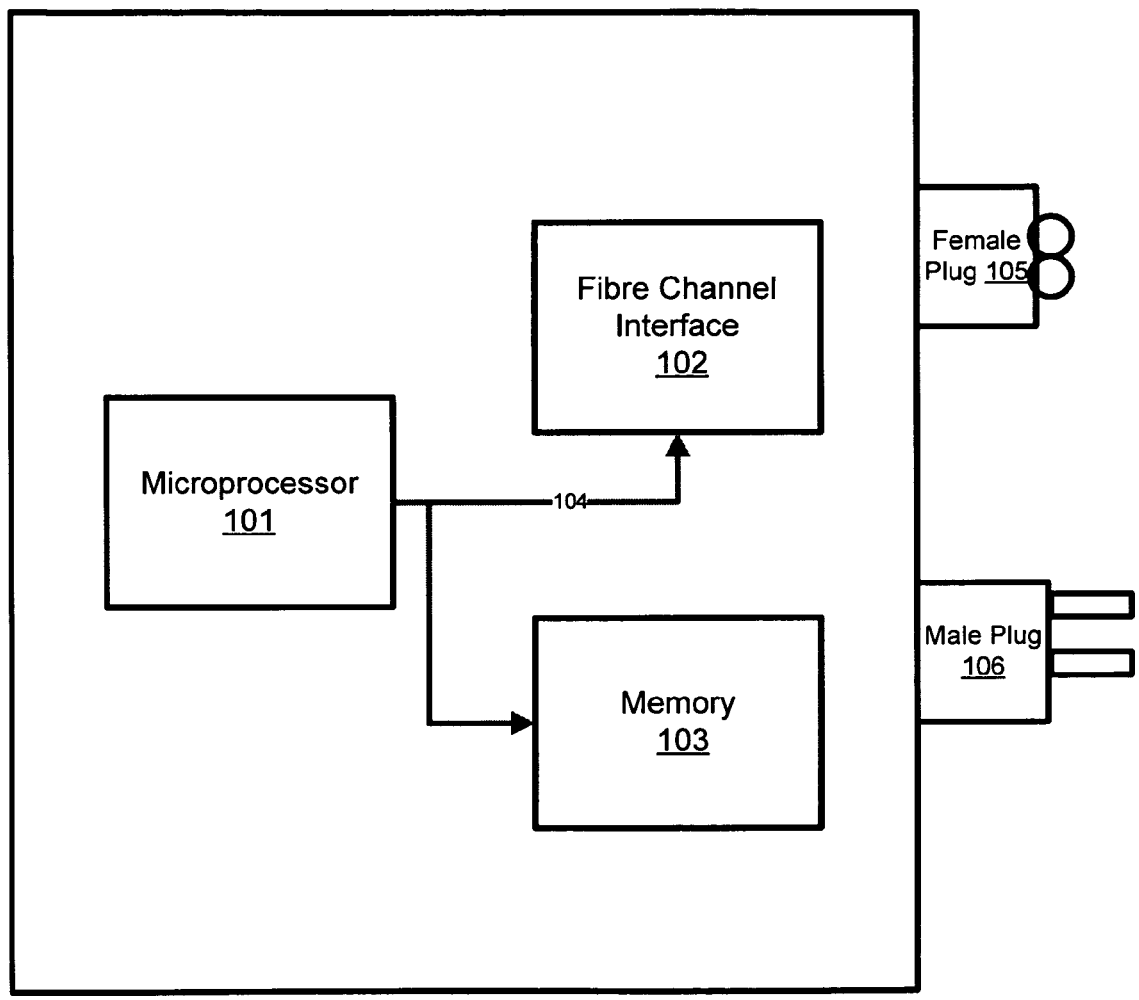
FIG. 1 illustrates an example of the hardware architecture of a simple portable testing device configured to identify link problem isolation and topology capabilities.

FIG. 1 illustrates an example of the hardware architecture of a simple portable testing device configured to identify link problem isolation and topology capabilities. The testing device includes a microprocessor 101, memory 103, and a fibre channel interface 102. Components 101-103 may communicate via a system bus 104. Memory 103 may be one or more medium that is capable of storing data, for example a flash memory, a hard disk, optical storage, or a solid-state memory. Processor 101 controls the operation of the device via machine readable code stored within said memory. Fibre channel interface 102 includes chipsets, as known in the art. The testing device also includes a plurality of fibre channel plugs 105 and 106.

Figure 2:
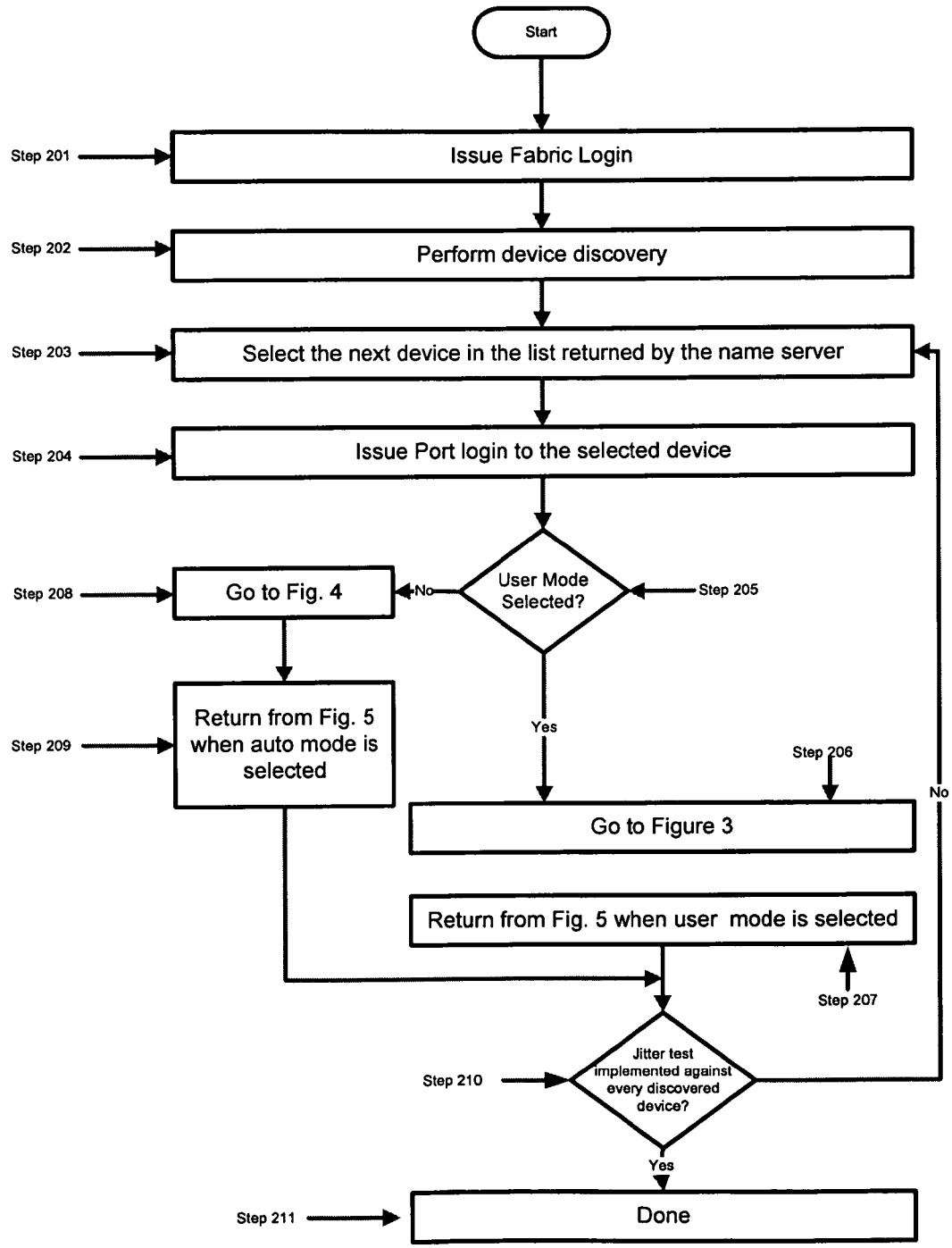
FIG. 2 illustrates the initial fabric login steps, as known in the art of fibre channel.
Figure 3:
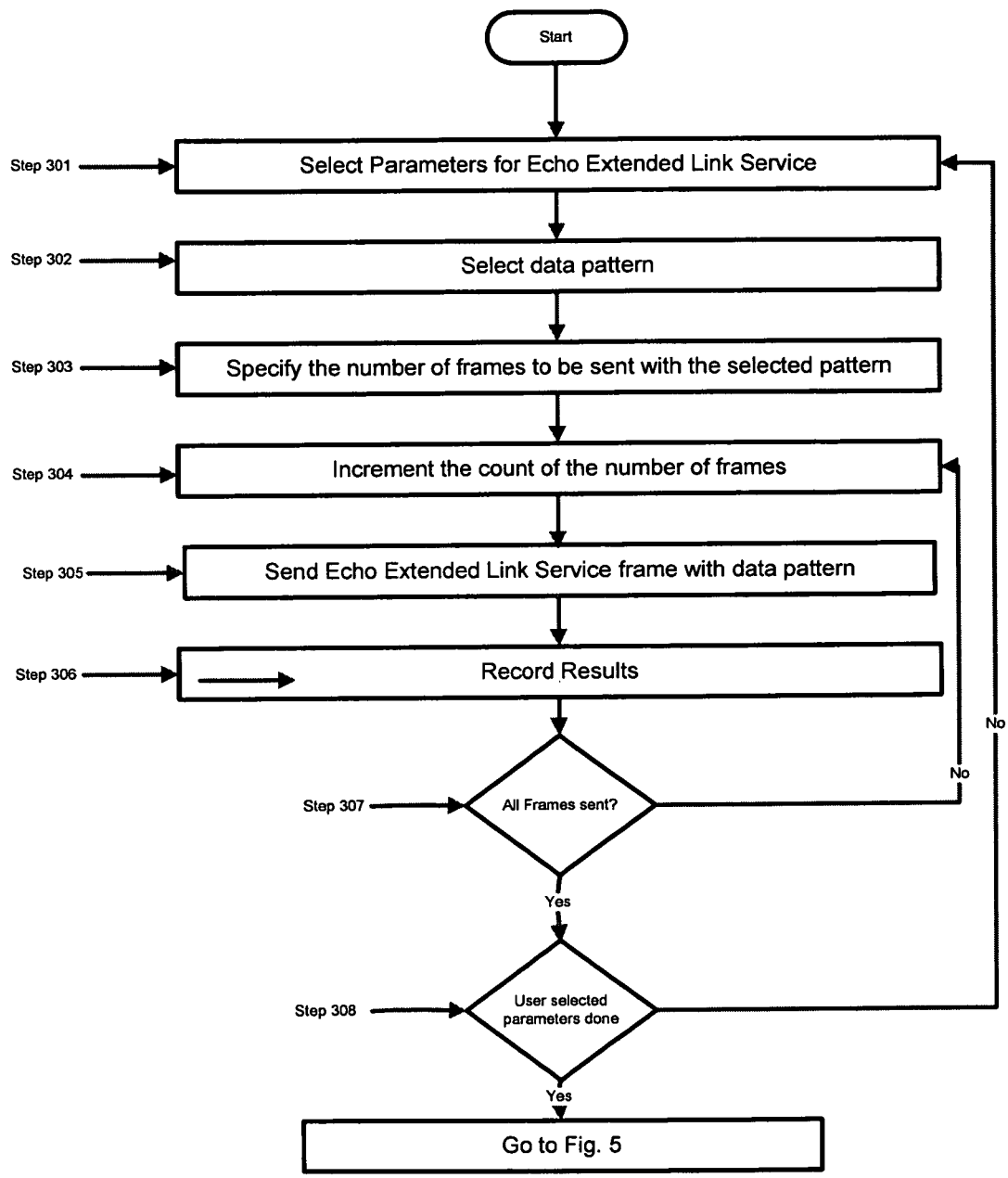
FIG. 3 illustrates the steps for issuing a user selected data pattern.

FIG. 2 illustrates the initial fabric login steps, as known in the art of fibre channel. In Step 201, the testing device issues a frame called fabric login (flogi), so that the testing device may communicate with the fabric. In Step 202, the testing device port logs onto the fabric name server and issues a name server query. In response to the query, the fabric name server returns a list of end devices. In Step 203, an end device in the list that was returned by the name server may be selected, starting with the first entry in the list and proceeding to the next entry each time the testing device loops back to Step 203. In Step 204, the testing device performs a port login with the selected end device to be tested. In Step 205, a decision is made as to which mode the testing device is to operate, for example, if the testing device is to operate in the user mode or automatic mode. If user mode is selected by the user then the process continues as shown in FIG. 3, which is discussed below. If the automatic mode is selected by the user then the process continues as shown in FIG. 4, which is also discussed below.

Figure 4:
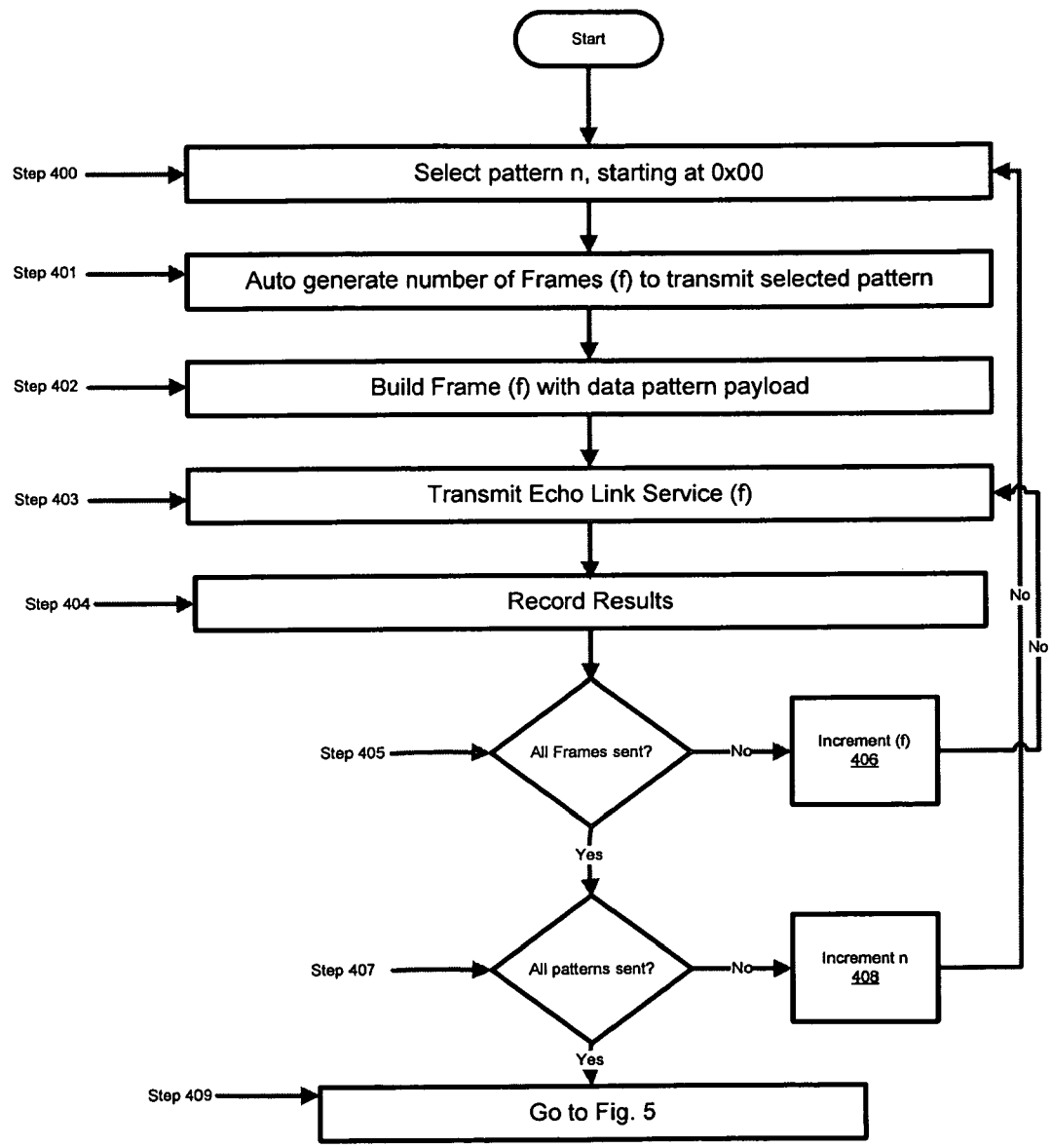
FIG. 4 illustrates the steps for issuing an automatic mode data pattern.

Once all the testing illustrated in FIG. 3 or FIG. 4 is completed, the process returns to Step 209 or 207 of FIG. 2. In Step 210, a decision is made as to whether all the end devices in the list returned by the name server have been tested. If all of the end devices were tested, then in Step 211, the process terminates. If all devices in the list returned by the name server were not tested the process returns to step 203 where the next device in the list returned by the query to the name server is selected and the process is repeated from Step 203. The process of testing, looping back and selecting the next end device to be tested continues until all of the end devices in the list are tested.

FIG. 3 illustrates the steps for issuing a user selected data pattern. In Step 301, the user specifies intent to select the parameters to be used to build the payload of the frame, known in the art of fibre channel as an extended link service. In step 302, a selected data pattern is chosen from a list of data patterns, starting with the first pattern in the list the first time through the process and then moving to the next pattern in the list each successive time through the process. Any number of data patterns may be specified by the user. In Step 303, the number of frames to be sent with the pattern selected above is specified. In Step 304, the count of the number of frames which have been sent is incremented by one. In Step 305, the echo extended link service frame is sent with the data pattern chosen in Step 302. This specifically constructed frame is sent to the end device being tested. In Step 306, the results of Step 305 are recorded as specified in FIG. 5, which is discussed below. In Step 307, if there are still additional frames to be sent, the process returns to Step 304. If all frames have been sent, the process continues to Step 308. In Step 308, if all the user selected parameters have been exercised, the process continues on to FIG. 5. If there are still user patterns to be exercised, the process returns to Step 301.

FIG. 4 illustrates the steps for issuing an automatic mode data pattern. In Step 400, a pattern 'n' is automatically selected, starting at 0x00. In Step 401, the number of frames is automatically generated to transmit the selected data pattern. In Step 402, a frame 'f' is built with data pattern payload. In Step 403, an echo link service command is transmitted with frame. In Step 404, results are recorded and the count for the total frames transmitted and total patterns transmitted is incremented. In Step 405, a determination is made as to whether the frame previously transmitted is the last frame for data pattern. In Step 406, if the previous frame is not last frame, the process increments and proceeds to transmit the next frame, as disclosed above in Step 402. In Step 407, if it is determined that the previous frame is the last frame, a determination is made as to if all data patterns have been sent. In Step 408, if all data patterns have not been sent, the process increments 'n' to the next data pattern and proceeds to Step 400 to select the next pattern 'n'. In Step 409, if all data patterns have been transmitted, the process continues on to FIG. 5

Figure 5:
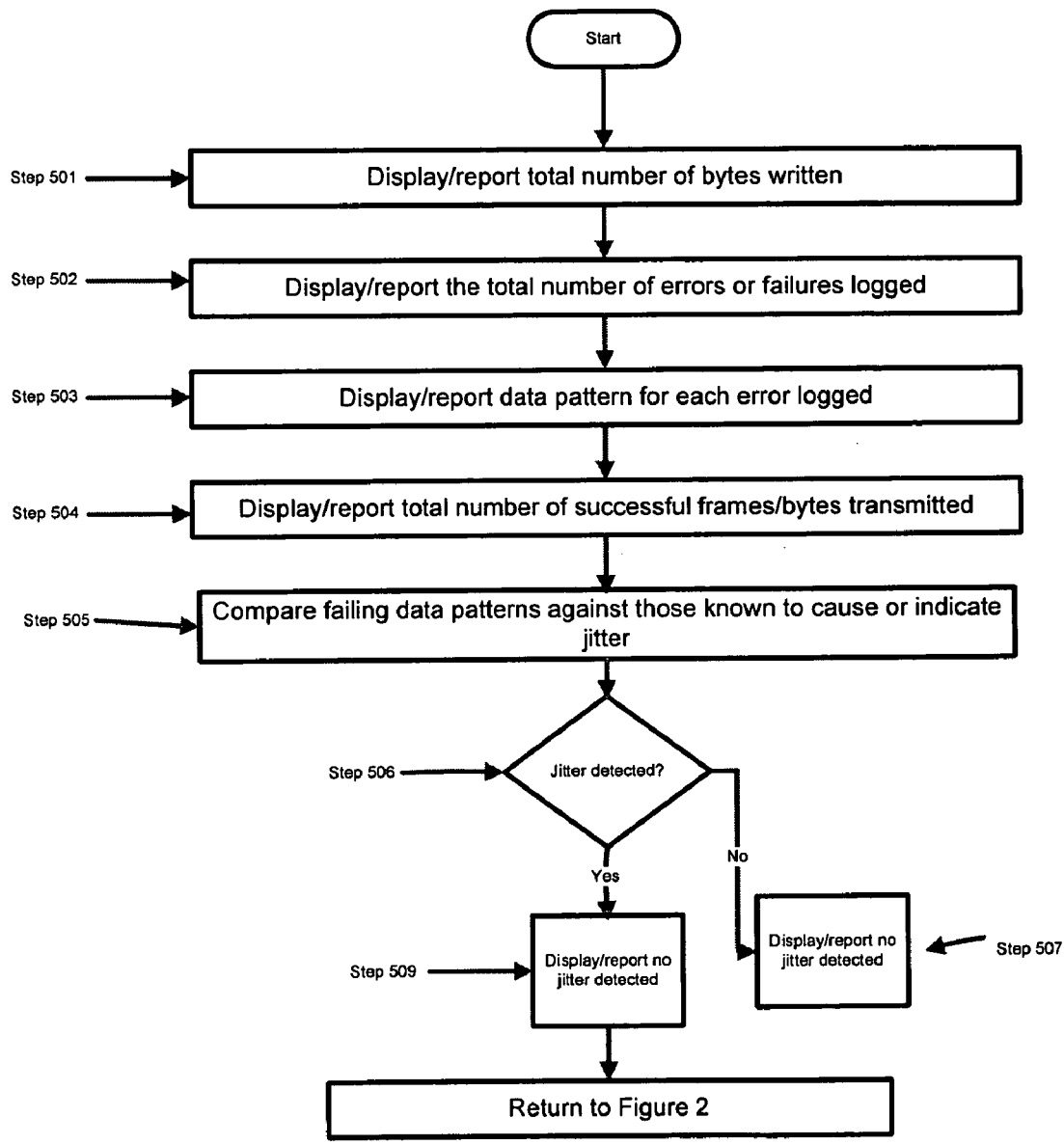
FIG. 5 illustrates steps for concluding the testing process and reporting results following the testing of all discovered devices.

FIG. 5 illustrates steps for concluding the testing process and reporting results following the testing of all discovered devices. In Step 501, the total bytes written to all devices, cumulative of all frames, is reported. In Step 502, the total number of errors (or failures) logged during the test cycle is reported. In Step 503, for each error or failure reported in step 502, the related data pattern is reported, regardless of the operating mode selected. That is, the related data pattern is reported regardless of whether the data pattern is an automatic generated data pattern or a user selected pattern. In Step 504, the total of all successful frames transmitted and total bytes successfully transmitted are reported. In Step 505, failed data patterns, received from the end device, are compared to a library of data patterns known to cause jitter or known as strong indications of a jitter condition. In Step 506, the results are evaluated to determine if a jitter condition or jitter indication has been detected. In Step 507, if no jitter problem is detected, the process returns to the start of test cycle and either retests or exits. In Step 508, a detected jitter problem is reported as a test result and the process returns to start of test cycle either retests or exits.

In all modes, the end user may receive a report of success or failure and any other information that is applicable and available. In an embodiment of the invention, one implementation might include at least one of the following:

1) A jitter indication because a known jitter pattern failed or no indication of a jitter problem.

2) An indication that a reply to the echo extended link service was not received within the time-out period.

3) An indication that the echo reply was received with bad cyclic redundancy check.

4) An indication that the echo reply was received with bad disparity.

5) An indication that the echo reply was received with an end of frame abort frame delimiter (eofta).

In an example, the report might indicate that a data pattern failed a certain number of times, for example, data pattern EF, failed in 4 out of 6 frames. In an example, the report might indicate that a data pattern failed a certain number of times, for example, data pattern EF, failed in 4 out of 6 frames.

Figure 6:
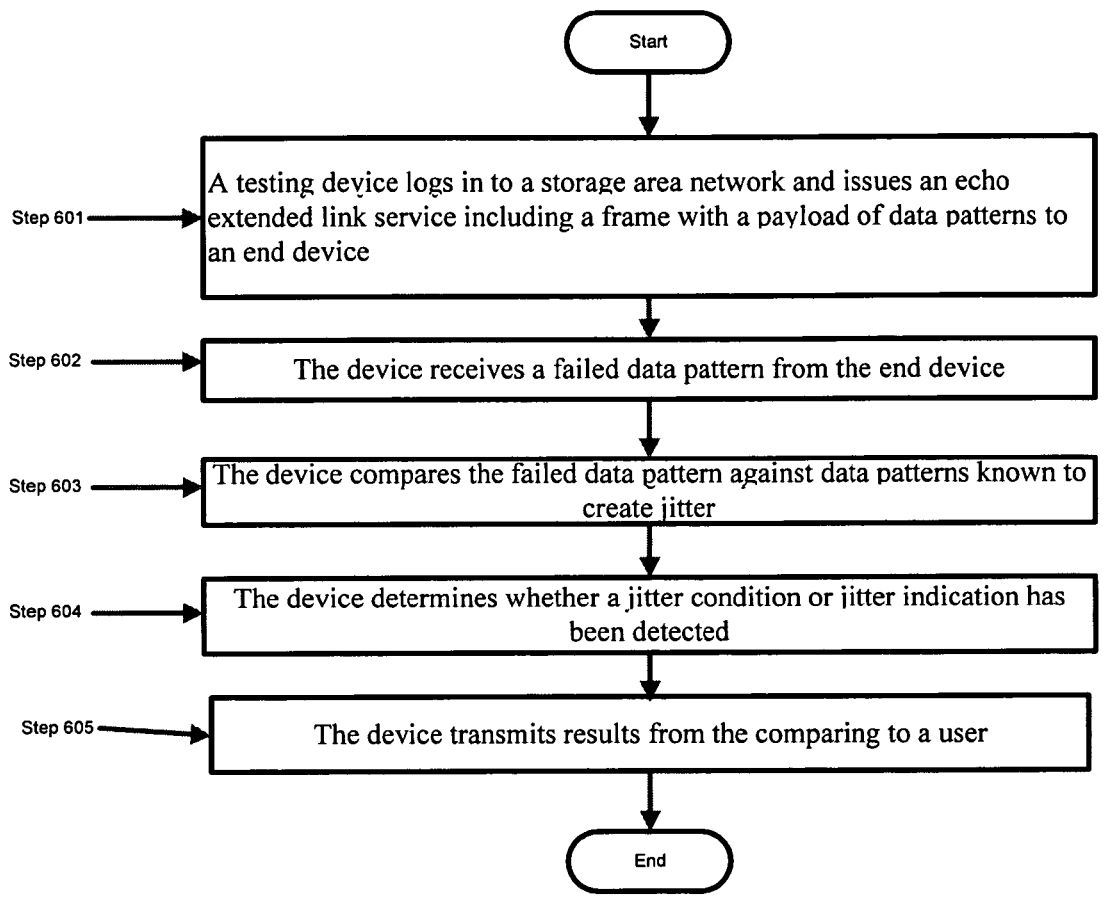
FIG. 6 illustrates steps implemented in an embodiment of the invention.

FIG. 6 illustrates the steps implemented in an embodiment of the invention. In Step 601, a testing device logs in to a storage area network and issues an echo extended link service including a frame with a payload of data patterns to an end device. The echo extended link service is used to send data with a specified data pattern upon logging on to the end device. In Step 602, in response to the echo extended link service, the device receives a failed data pattern from the end device. In Step 603, the device compares the failed data pattern against data patterns known to create jitter. In Step 604, the device determines whether a jitter condition or jitter indication has been detected. In Step 605, the device transmits results from the comparing to a user.

Although the present invention has been shown and described with respect to certain embodiments, it should be understood by those skilled in the art that various modifications can be made to the inventive testing device and the method of the instant invention without departing from the scope and spirit of the invention. It is intended that the present invention cover modifications and variations of the inventive testing device and method provided they come within the scope of the appended claims and their equivalents.

What is claimed:

1. A method, comprising:

logging on to a storage area network and receiving a list of all switches and paths from a testing device to end devices to be tested;

interrogating each link and port from the testing device to the end devices to determine a failing link or port;

issuing at least one echo extended link service command including a frame with a payload of data patterns to an end device to be tested, wherein the echo extended link service command is used to send data with a specified data pattern upon logging on to the end device;

re-interrogating each link and port from the testing device to the end devices to determine a failing link or port;

recording results based on the echo link service command, logging errors encountered during each testing cycle, recording a failed data pattern associated with each logged error, and comparing the failed data pattern against a library of data patterns known to create jitter; and determining whether a jitter condition or jitter indication has been detected and transmitting results from the comparing to a user.

2. The method of claim 1, wherein the results comprise at least one of a known jitter indication, no indication of a jitter problem, an indication that a reply to the echo link service command was not received within a timeout period, an indication that a reply to the echo link service command was received with bad disparity, or an indication that a reply to the echo link service command was received with an end of frame about delimiter.

3. The method of claim 1, wherein the interrogating comprises issuing a read link error status block command to an end port.

4. The method of claim 1, wherein the interrogating comprises issuing a get port statistic command to each switch port to obtain port statistics for each port in the path.

5. The method of claim 1, further comprising, prior to the issuing, selecting by the testing device at least one end device from a list of end devices returned by a server and performing a port login with the selected end device.

6. The method of claim 5, further comprising determining by the testing device whether to test the selected end device in a user mode or an automatic mode.

7. The method of claim 6, wherein in the user mode the user is allowed to select parameters to be used to build the payload of the frame.

8. The method of claim 6, wherein in the automatic mode at least one data pattern is automatically selected and a number of frames is automatically generated to transmit the selected data pattern.

9. The method of claim 1, further comprising determining whether all end devices have been tested, and if all end devices have not been tested, testing the next end device on the list.

10. An apparatus, comprising:

means for logging on to a storage area network and receiving a list of all switches and paths from a testing device to end devices to be tested;

means for interrogating each link and port from the testing device to the end devices to determine a failing link or port;

means for issuing at least one echo extended link service command including a frame with a payload of data patterns to an end device to be tested, wherein the echo extended link service command is used to send data with a specified data pattern upon logging on to the end device;

means for re-interrogating each link and port from the testing device to the end devices to determine a failing link or port;

means for recording results based on the echo link service command, logging errors encountered during each testing cycle, recording a failed data pattern associated with each logged error, and comparing the failed data pattern against a library of data patterns known to create jitter; and means for determining whether a jitter condition or jitter indication has been detected and transmitting results from the comparing to a user.

11. A testing device configured to:

log in to a storage area network and discover all domains and ports in the storage area network;

interrogate each link and port to the end devices to determine a failing link or port;

issue at least one echo extended link service command including a frame with a payload of data patterns to an end device to be tested, wherein the echo extended link service command is used to send data with a specified data pattern upon logging on to the end device;

re-interrogate each link and port from the testing device to the end devices to determine a failing link or port;

record results based on the echo link service command, log errors encountered during each testing cycle, record a failed data pattern associated with each logged error, and compare the failed data pattern against a library of data patterns known to create jitter; and determine whether a jitter condition or jitter indication has been detected and transmit results to a user.

12. The testing device of claim 11, wherein the results comprise at least one of a known jitter indication, no indication of a jitter problem, an indication that a reply to the echo link service command was not received within a timeout period, an indication that a reply to the echo link service command was received with bad disparity, or an indication that a reply to the echo link service command was received with an end of frame about delimiter.

13. The testing device of claim 11, wherein the testing device is configured to interrogate by issuing a read link error status block command to an end port.

14. The testing device of claim 11, wherein the testing device is configured to interrogate by issuing a get port statistic command to each switch port to obtain port statistics for each port in the path.

15. The testing device of claim 11, wherein prior to issuing the at least one echo extended link service command, the testing device is configured to select at least one end device from a list of end devices returned by a server and perform a port login with the selected end device.

16. The testing device of claim 15, wherein the testing device is configured to determine whether to test the selected end device in a user mode or an automatic mode.

17. The testing device of claim 16, wherein in the user mode a user is allowed to select parameters to be used to build the payload of the frame.

18. The testing device of claim 16, wherein in the automatic mode, the testing device is configured to automatically select at least one data pattern and a number of frames is automatically generated to transmit the selected data pattern.

19. The testing device of claim 15, wherein the testing device is configured to determine whether all end devices have been tested, and if all end devices have not been tested, the testing device is configured to test the next end device.

* * * * *